UNITED STATES PATENT OFFICE.

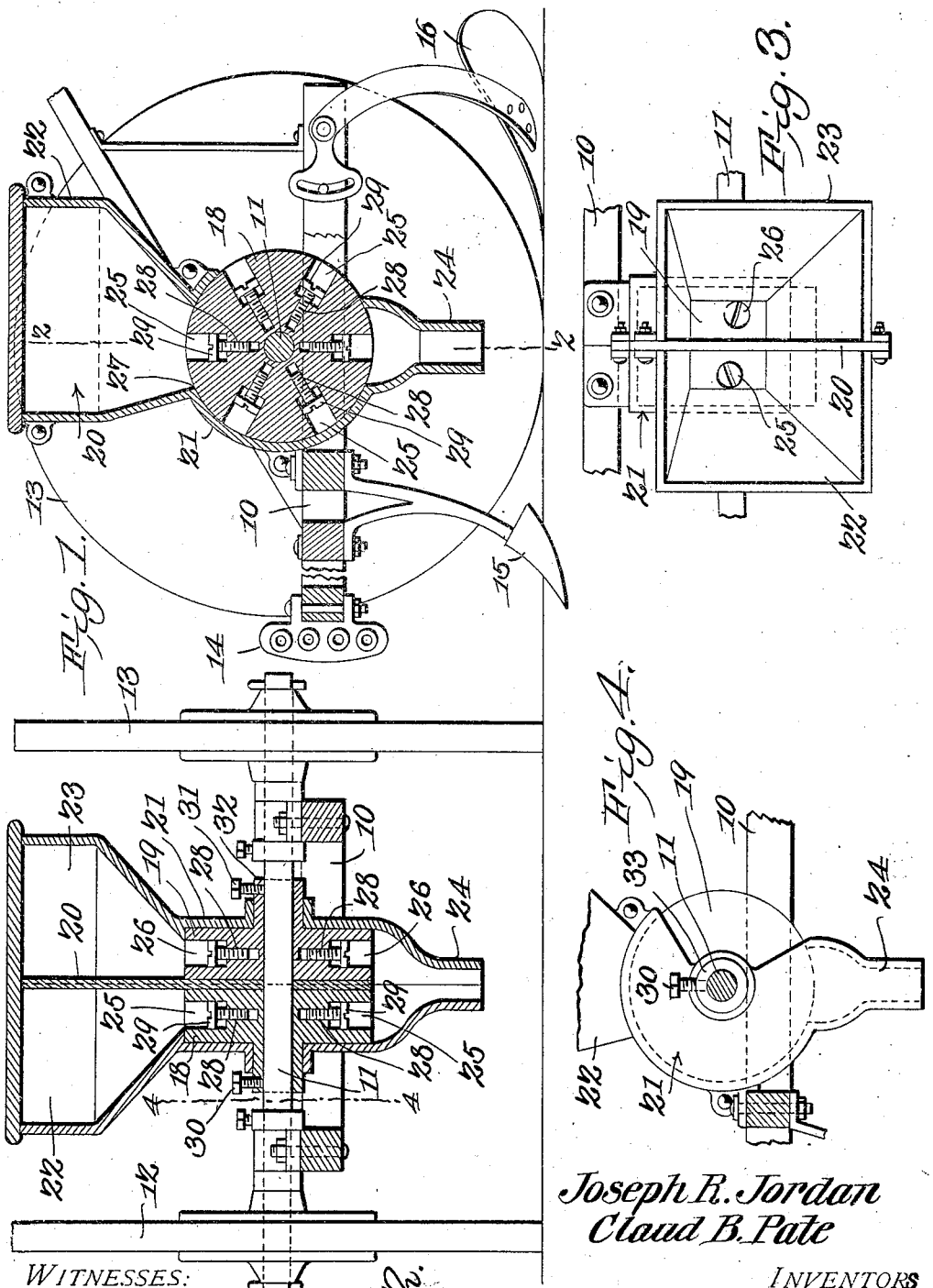

JOSEPH R. JORDAN AND CLAUD B. PATE, OF SALEMBURG, NORTH CAROLINA.

CORN-PLANTER.

No. 841,982.　　　　Specification of Letters Patent.　　　　Patented Jan. 22, 1907.

Application filed May 4, 1906. Serial No. 315,215.

*To all whom it may concern:*

Be it known that we, JOSEPH R. JORDAN and CLAUD B. PATE, citizens of the United States, residing at Salemburg, in the county of Sampson and State of North Carolina, have invented a new and useful Corn-Planter, of which the following is a specification.

This invention relates to combined seed-planters and fertilizer-distributers, and has for its object the production of a simply-constructed and efficient device of this character whereby the seeds are discharged from the machine intermittently and the fertilizer material likewise discharged from the machine intermittently, the fertilizer material being discharged in the intervals between the discharges of the seeds, so that the seeds are first discharged into a trench formed for them and the fertilizer then deposited upon the seeds.

With these and other objects in view, which will appear as the nature of the invention is better understood, the invention consists in certain novel features of construction, as hereinafter fully described and claimed.

In the accompanying drawings, forming a part of this specification, and in which corresponding parts are denoted by like designating characters, is illustrated the preferred form of the embodiment of the invention capable of carrying the same into practical operation.

In the drawings, Figure 1 is a longitudinal sectional elevation. Fig. 2 is a transverse section on the line 2 2 of Fig. 1. Fig. 3 is a plan view of a portion of the apparatus. Fig. 4 is a side view of a portion of the apparatus with the axle and frame in section on the line 4 4 of Fig. 2.

In the improved apparatus is comprised a supporting-frame 10 of any approved from, having a main drive shaft or axle 11 disposed transversely thereof and provided with ground-wheels 12 13 and provided with a draft-clevis 14, a furrow-opener 15 in advance of the axle, and a coverer 16 rearwardly of the axle, the ground-wheels being fast upon the shaft or axle, so that the latter partakes of the motion of the wheels.

Mounted upon the axle 11 are two drums 18 19, adapted to be independently adjusted rotatively upon the axle, as by set-screws 30 31, and with a partition 20 encircling the
axle and extending between the drums and above the same. The drums are inclosed by a casing 21, cut away at the rear, and extending from this casing are hoppers 22 23, the partition 20 dividing the hoppers so that each drum has its own independent hopper, while the casing 21 is provided with a single discharge-spout 24 common to both drums. The drum 18 is provided with a hub 33, extending sufficiently beyond the casing 21 to receive the set-screw 30, and the drum 19 is provided with a like hub 32, extending a sufficient distance beyond the casing to receive the set-screw 31, so that the drums may be adjusted from the exterior of the casing and without removing any of the parts, as will be obvious. By this simple means the drums may be independently adjusted rotatively of the axle, as before noted, and without disturbing any other parts of the machine.

Formed in the periphery of the drum 18 are spaced cavities or pockets 25, and likewise formed in the periphery of the drum 19 are spaced cavities or pockets 26, the pockets designed to receive the seeds and the fertilizer material from the hoppers as the drums are rotated beneath them, the pockets of the drums 19 being disposed opposite the spaces between the pockets of the drums 18.

By this simple arrangement as the machine is drawn forward the furrow-opener 15 forms a trench for the reception of the seeds and fertilizer material in advance of the discharge-spout 24, and as the axle 11 is rotated by the motion of the ground-wheels 12 13 the drums 18 19 are caused to pass beneath the hoppers 22 23 and receive therefrom the seeds and fertilizer material in their pockets and carry it forward and discharge it into the spout 24, the forward portion 27 of the casing 21 forming a cut-off element to the pockets.

The drum which is designed to receive the seeds will be so arranged upon the axle that its pockets will be a sufficient distance in advance of the pockets of the other drum, which is designed to receive the fertilizer material, that the seeds are dropped slightly in advance of the fertilizer material, so that the latter is deposited upon top of the seeds in the trench above described, the rotative adjustment of the drums upon the axle providing means whereby the relative location of the seed-receiving pockets and the fertilizerreceiving pockets may be adjusted to any extent required, as before described.

In the bottom of each of the pockets a threaded aperture is formed in which a threaded stem 28 is inserted, each stem having a head 29 fitting the interior of the pocket, so that the capacity of the pockets may be increased or decreased, as desired, by simply rotating the head with its threaded stem to the right or left, and thus adjusting the heads in the pockets. The sizes or capacity of the pockets may thus be regulated to adapt the device to different kinds of seeds or to a larger or smaller quantity of seeds to be deposited into and discharged from each pocket, this adjustment being also common to the fertilizer-pockets.

The seeds are deposited in one of the hoppers 22 or 23 and the fertilizer material in the other hopper, the partition 20 maintaining the material in separated position, as will be obvious. Each seed-pocket is thus supplied with its specified quantity of seeds, and each fertilizer-material pocket is likewise supplied with its specified quantity of fertilizer material and the seeds discharged slightly in advance of the corresponding quantity of fertilizer material, so that the latter is deposited over the seeds in the best shape to accomplish the largest benefit thereto.

As the machine moves forward the coverer 16 restores the earth thrown out by the furrow-opener and completes the operation.

Any required number of pockets may be arranged in the drums, and pockets of any size may be employed, and the machine thus adapted to various sizes and species of seeds.

Having thus described the invention, what is claimed as new is—

In an apparatus of the class described, a supporting-frame including spaced longitudinal members and spaced transverse members, an axle mounted for rotation upon said frame and having spaced ground-wheels, a dividing-plate through which said axle passes and extending above and below the same, drums each having a plurality of pockets in its outer face and rotative upon said axle at opposite sides of the plate and bearing against the plate, sleeves extending from said drums in opposite directions and engaging said axle, set-screws operating through said sleeves and providing means for independently adjusting the drums upon the axle, casings inclosing said drums and bearing at their inner edges against said plate, feed-hoppers extending above said casings and communicating with said drums, tubular conductors leading from said casings, means for connecting said feed-hoppers to said plate, and means for connecting said casings to said transverse frame members.

In testimony that we claim the foregoing as our own we have hereto affixed our signatures in the presence of two witnesses.
JOSEPH R. JORDAN.
CLAUD B. PATE.

Witnesses:
E. ROSEAR HALL,
H. C. JACKSON.